United States Patent [19]

Ladt

[11] 4,372,730
[45] Feb. 8, 1983

[54] LOAD OUT PIVOTING CHUTE SYSTEM AND METHOD

[75] Inventor: Carroll H. Ladt, Paducah, Ky.

[73] Assignee: Pebco, Inc., Paducah, Ky.

[21] Appl. No.: 221,352

[22] Filed: Dec. 29, 1980

[51] Int. Cl.³ .............................................. B65G 67/06
[52] U.S. Cl. ..................................... 414/786; 193/21; 222/504; 222/536; 222/559
[58] Field of Search ............... 414/160, 200, 206, 208, 414/299, 328, 329, 397, 786; 193/17, 20, 21; 222/504, 536, 559

[56] References Cited

U.S. PATENT DOCUMENTS

| | | |
|---|---|---|
| 360,290 | 3/1887 | Gilson . |
| 1,015,251 | 1/1912 | Schraeder . |
| 1,863,028 | 6/1932 | Pardee .............................. 193/17 X |
| 2,219,226 | 10/1940 | Gerber ................................. 193/17 |
| 2,331,724 | 10/1943 | Plant . |
| 4,125,195 | 11/1978 | Sasadi . |

Primary Examiner—Robert G. Sheridan
Attorney, Agent, or Firm—King and Liles

[57] ABSTRACT

A load out chute system for controlling and directing the flow of relatively large quantities of bulk material, such as coal, is disclosed. The chute system includes an upper chute and a sliding gate valve positioned above the upper chute. A pair of hydraulic cylinders move the valve plates of the upper gate valve into partially overlapping relation for effective sealing of the flowpath. A lower chute pivots from a horizontal stored position to a position wherein the upper and lower flow paths align for discharging material. The lower chute includes a triangular skirt pivotally secured to an overhead structure and includes an arcuate bottom plate enabling the lower chute to cover the upper chute discharge opening when the lower chute is pivoted up. A corresponding curved retainer plate is operative to cover the lower chute inlet opening. A curved blade gate valve is positioned at the bottom portion of the lower chute; the blade is operative to enter the lower flow path for incrementally opening and closing the lower flow path whereby precise topping off at the end of the loading cycle may be achieved and material spillage is minimized. A power cylinder interconnected to the chute with a cable and pulley arrangement pivots the chute. A power winch moves the cable to incrementally adjust the lower flow path to ensure proper alignment with the upper flow path.

20 Claims, 5 Drawing Figures

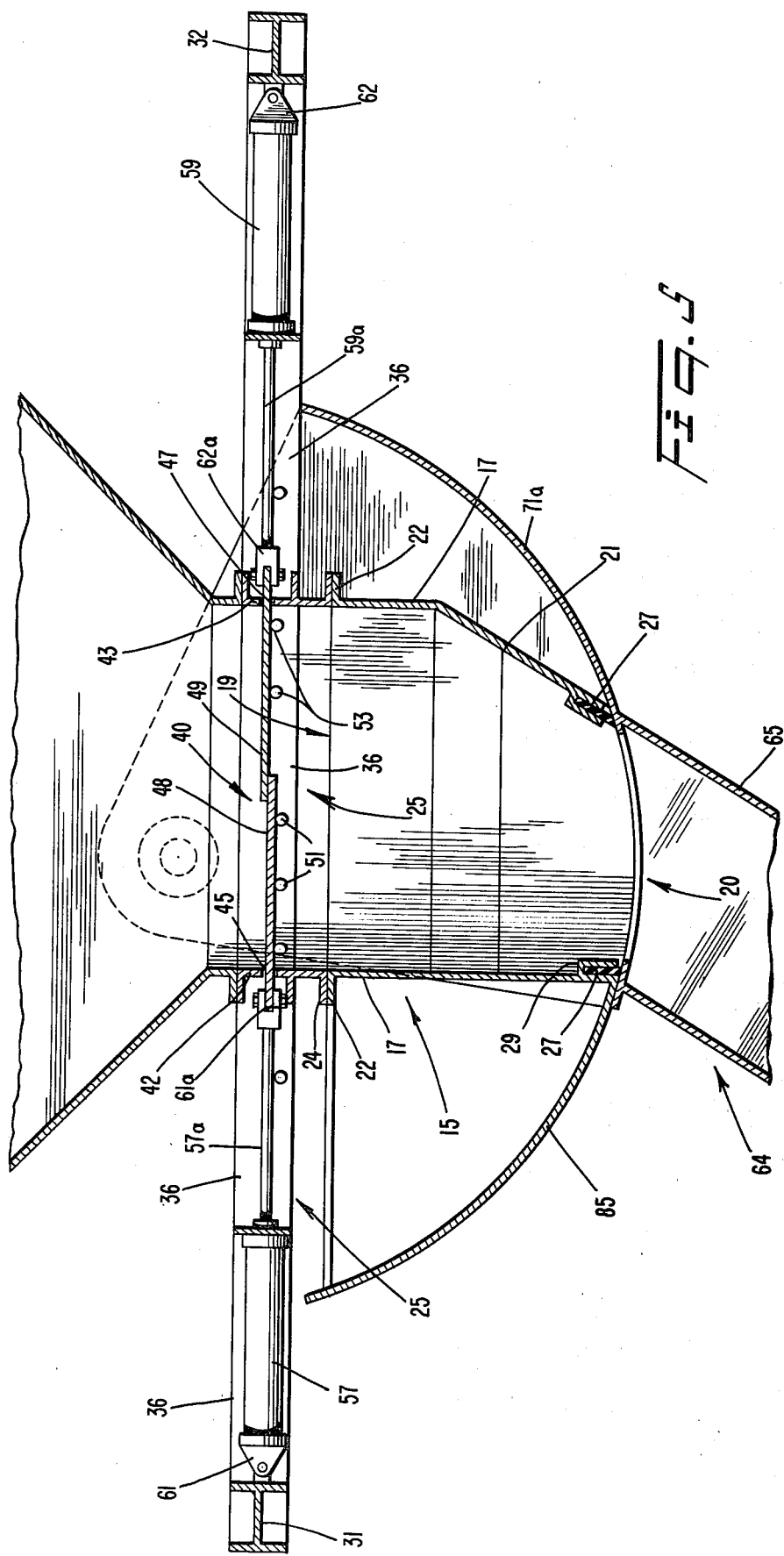

LOAD OUT PIVOTING CHUTE SYSTEM AND METHOD

BACKGROUND OF THE INVENTION

This invention generally relates to chute loading systems, and more particularly, to systems including chutes pivoted into and out of loading position, and capable of rapid chute positioning and flow control, including incremental flow adjustment.

Prior art chutes are known for use in loading facilities for directing the flow of material from large overhead storage bins into hopper cars positioned below. A common type of loading chute is capable of lateral and telescopic vertical movement for positioning above a hopper car. For lateral movement, such prior art chutes are rollably secured to an independent overhead frame structure. The chute generally includes a gate valve positioned adjacent the top inlet opening of the chute. Generally speaking, these prior art chutes are effective for rapid material loading after proper alignment with the loading vehicle; however, such prior art chutes require precise lateral positioning followed by telescopic lowering of the chute to a proper discharge height, often a time consuming process. In addition, when the car is substantially filled it is difficult to achieve precise topping off without spilling material.

Loading chutes capable of pivoting into discharge position are known. Such prior art chutes generally offer the advantage of fast overhead positioning and rapid material flow. Often, however, similar difficulties are encountered in relation to precise topping off as with telescoping chutes. Some attempts have been made to improve flow control as car loading capacity is achieved. One such attempt is disclosed in the prior U.S. Pat. No. 1,863,028 of Pardee, Jr. wherein a pivoting chute includes a plurality of retarder plates positioned within the flow path of the chute. As material is loaded in the car the chute is gradually raised thereby projecting the retarders into the flow path to reduce the flow. A separate chute is positioned adjacent the main chute for topping off the car with material discharged from a separate auxiliary outlet. Although better control of material flow is achieved with this device, such control requires constant, gradual pivoting of the chute structure in addition to requiring a separate topping off chute and discharge outlet structure.

SUMMARY OF THE INVENTION

It is accordingly an object of the present invention to provide a load out chute system and method capable of precise flow control including incremental flow control of relatively large quantities of bulk materials.

Another related object of the invention is to provide a load out chute system capable of rapid, as well as gradual pivoting movement to effectuate better loading conditions.

Yet another object is to provide a load out chute system wherein a plurality of valves provide improved control of bulk material throughout the loading cycle.

Still another object is to provide a load out chute system that is rugged in design and capable of reliable operation in hostile environments.

Additional objects, advantages and novel features of the invention will be set forth in part in the description which follows and in part will become apparent to those skilled in the art upon examination of the following or may be learned by practice of the invention. The objects and advantages of the invention may be realized and attained by means of the instrumentalities and combinations particularly pointed out in the appended claims.

The load out chute system of the present invention is capable of controlling and directing the flow of relatively large quantities of bulk material and comprises a fixed upper chute formed of side body members defining an upper flow path having top inlet and bottom discharge openings through the chute. A dual sliding gate valve is positioned adjacent above the top inlet opening for opening and closing the upper chute to control feeding of material along the upper flow path. The gate valve includes two horizontally disposed flat plates slidably engaging roller means for smooth and low friction opening and closing movement.

A lower chute having top inlet and bottom discharge openings defining a lower flow path is pivotally mounted in relation to the upper chute by triangular-shaped skirts projecting upwardly from the lower chute and pivotally secured to an overhead independent frame structure. The angled skirts are appropriately dimensioned to enable the lower chute top inlet opening to travel in an arcuate path for proper alignment with the upper chute discharge opening during loading.

A curved valve plate projects upwardly from the lower chute and is effective to cover the upper chute bottom discharge opening as the lower chute is brought to a raised position, thereby preventing material spillage from the upper chute. A corresponding curved retaining plate projects upwardly from the upper chute and is effective to cover the lower chute inlet opening during upward pivotal movement and similarly prevents material from spilling out of the lower chute as the chute is raised to horizontal stored position. Regulator valve means is carried by the lower chute for regulating the flow of material along the lower flow path in increments from full open to full closed.

Preferably, such regulator valve means includes a curved blade gate valve having a valve plate attached to corresponding mounting flanges pivotally secured to the lower chute. The plate is operative to project into the lower flow path through a slotted opening in a side body member of the chute for controlling material flow. Positioning of the valve means at the bottom of the lower chute in proximity to the lower chute bottom discharge opening effectuates greater control of material during topping off and reduces the possibility of material spillage.

Means are provided for pivotally moving the lower chute into and out of load out position. When in the load out position, the lower chute is in communication with the upper chute. Such chute pivoting means preferably includes a hydraulic cylinder interconnected to the lower chute by a cable extending around pulley means, enabling rapid positioning of the chute. A power winch is also provided attached to the other end of the cables for enabling fine adjustments to be made to the slide angle of the lower flow path. With the above features, the load out chute system of the present invention is capable of rapid deployment, as well as gradual pivoting movement for finer material flow control.

BRIEF DESCRIPTION OF THE DRAWINGS

FIG. 3 is an enlarged, partial sectional view taken along the line 3—3 of FIG. 2, showing alignment in the load out position of the lower chute with the upper chute and wherein the valves are in fully closed position;

FIG. 4 is an enlarged, partial sectional view illustrating the curved blade gate valve pivotally attached to the bottom portion of the lower chute and in the fully open position; and FIG. 5 is an enlarged, partial sectional view illustrating the dual sliding gate valve mechanism in closed position and the interface between the upper and lower chutes in full communication.

DETAILED DESCRIPTION OF THE INVENTION

Figure 1:
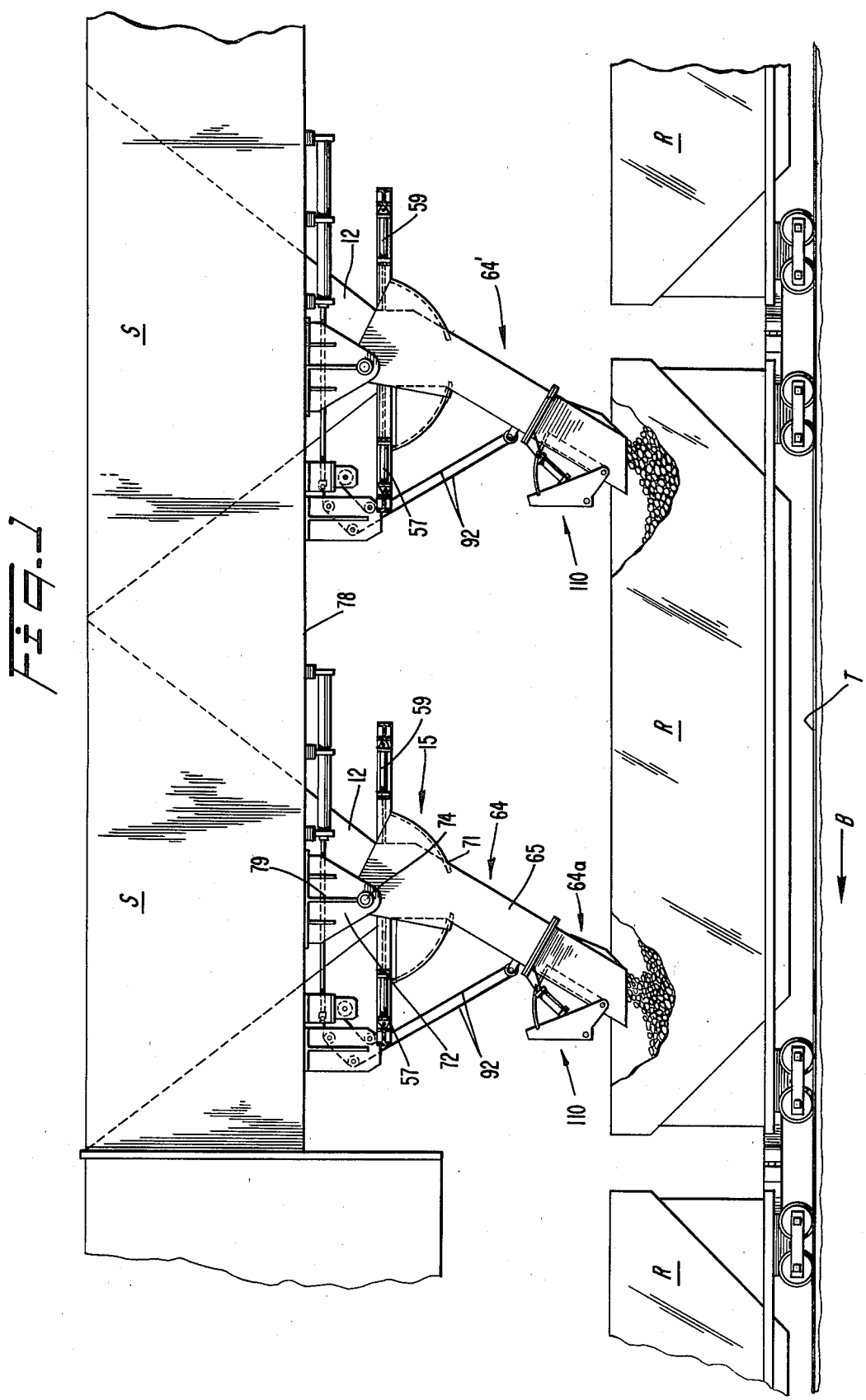
FIG. 1 is a side elevational view of primary and secondary chute systems according to the present invention in loading position.

Reference will now be made in detail to the present preferred embodiment of the invention, an example of which is illustrated in the accompanying drawing. Referring first to FIG. 1, two identical load out chute systems 10 of the invention are shown for directing bulk material, such as coal, from the storage bins S into railroad hopper car R. The chute systems are fabricated of steel plates and structural members in the unique manner and combination to be specifically set out below.

Figures 3, 4:
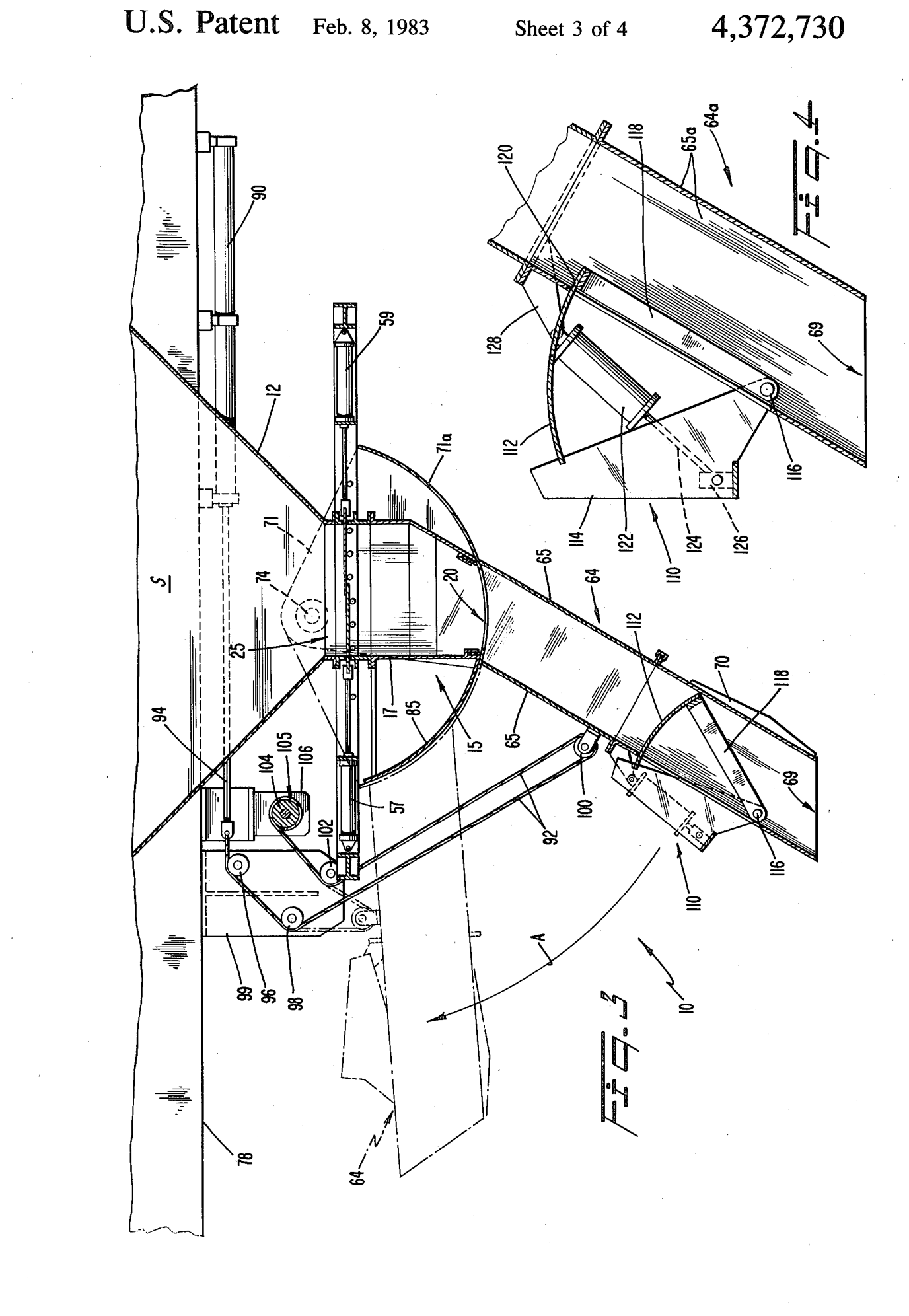

As shown in FIGS. 1 and 3, bulk material enters chute system 10 through upper chute 15 from bottom portion 12 of bin S. Upper chute 15 includes side body members 17 (FIG. 5) defining an upper flow path having a top inlet opening 19 and bottom discharge opening 20. One of body members 17 is formed having a lower downwardly inclined portion 21 for altering the vertical flow path of material to an inclined flow path and thus directing material through discharge opening 20. Upper mounting flanges 22 are provided for attaching upper chute 15 to corresponding flanges 24 in dual sliding gate valve 25 (FIGS. 3 and 5). Valve 25 is positioned adjacent top inlet opening 19 for controlling the flow of material entering the upper chute from storage bin S (FIG. 1). Flexible seal strips 27 extend around the perimeter of bottom discharge opening 20. Seal strips 27 are secured within brackets 29, enabling the strips to project downwardly below the discharge opening 20 to provide effective sealing action, as discussed below.

FIGS. 3 and 5 illustrate dual sliding gate valve 25 in the closed position. Valve 25 includes I-beam end members 31, 32, interconnected by side members 36 to form a rectangular frame housing. Intermediate the ends 31, 32 of frame housing is the valve opening 40 corresponding in size to top inlet opening 19 of upper chute 15. Valve opening 40 is defined by portions of side members 36 and parallel end channel members 42, 43 extending transversely between the side members. Each end member 42, 43 contains a transverse slotted opening 45, 47 enabling valve plates 48, 49 to slide through the openings for opening and closing valve 25. Accordingly, valve plates 48, 49 are transversely dimensioned to correspond to the slotted opening length; in addition, each valve plate has a length sufficient to close approximately one half of valve opening 40 and overlap with the other valve plate to provide an effective seal.

Preferably, first and second sets of rollers 51, 53 (FIG. 5), such as cam follower rollers, are secured in horizontal spaced relation to side members 36 for supporting the plates 48, 49. First and second roller sets 51, 53 are positioned in the above manner to enable valve plates 48, 49 to easily slide through respective slotted openings 45, 47 without excessive frictional contact. In addition, second roller set 53 is positioned along side members 36 in a manner enabling the bottom surface of valve plate 49 to partially overlap with the top surface of plate 48 when valve 25 is fully closed.

FIG. 5 further illustrates means for moving the valve plates 48, 49 across valve opening 40. Such means preferably include cylinders 57, 59 connected respectively to I-beams 31, 32 with pivotal couplings 61, 62. Piston rods 57a, 59a are connected respectively to valve plates 48, 49 with pivotal couplings 61a, 62a. The feature of double piston action assures high speed opening and closing action of the sliding gate valve 25. In addition, the modest height of valve 25 allows for space conservation, enabling the valve to be used in this location to conserve overhead space.

For the purpose of directing the flow of bulk material through upper chute 15 into car R, lower chute 64 is provided. As shown in FIG. 3, lower chute 64 includes side body members 65 defining a lower flow path having a top inlet opening corresponding to bottom discharge opening 20 of upper chute 10. A separate lower chute extension 64a is provided, for reasons discussed below. Chute extension 64a includes side body members 65a defining a flow path continuing from the lower flow path of chute 64. The peripheral bottom portion of chute extension 64a defines a bottom discharge opening 69. Bumper 70 is secured to the bottom portion of a side member 65a facing away from the direction of car travel, for the purpose of preventing damage to the lower chute in the event of impact with the car.

As best shown in FIG. 3, lower chute 64 is pivotally mounted in relation to upper chute 15 by means of triangular skirt 71, projecting upwardly from the top portion of parallel side body members 65. The hanger brackets 72 (FIG. 1) secures the skirt 71 by pivot shafts 74. The pair of hanger brackets 72 is secured to an independent overhead frame structure 78. Reinforcing gussets 79 formed in brackets 72 assist in supporting lower chute 64. The skirt 72 includes a curved bottom plate 71a that travels in an arcuate path below bottom discharge opening 20 of upper chute 15. The plate 71a is sufficient to completely close bottom discharge opening 20 when lower chute 64 is in stored position (shown in phantom in FIG. 3).

The lower chute 64 is thus capable of being pivoted into and out of axial alignment with the upper chute 15. FIG. 3 illustrates the flow paths of chutes 15, 64 in full communication, thus assuring a steady flow of material through chute system 10. Under these conditions, the connecting openings 20 of upper and lower chutes 15, 64 communicate fully. As lower chute 64 is pivoted upwardly in the direction indicated by arrow A (FIG. 3), a portion of the top opening 20 is closed by the plate 71a for the purpose of preventing material in upper chute 10 from spilling.

For the purpose of retaining material within lower chute 64 as the chute pivots upwardly, retaining means is provided. Such retaining means preferably includes a corresponding curved retaining plate 85 attached to upper chute 15. Retaining plate 85 projects upwardly from the side body member and fully covers the upper opening of the chute 64 after being raised to the stored position. The feature of seals 27, as discussed above, assures reliable wiping action along the plate 71a preventing interference from material within the closing flow path.

For pivotally moving the lower chute 64 into and out of alignment with the upper chute 15, power cylinders 90 (FIG. 2) are provided and are secured horizontally to overhead frame structure 78. Cable 92 interconnects piston rod 94 of cylinder 90 to lower chute 64 by pulley means. Such pulley means include overhead idler pulleys 96, 98 rotatably secured to hanger bracket 99 and pulley 100 rotatably secured to a side body member 65 of lower chute 64 facing the overhead pulleys. Pulleys 96, 98 and 100 are arranged in a co-planar manner enabling cable 92 to engage the pulleys. After engaging pulley 100, a return portion of cable 92 partially extends around idler pulley 102, also secured to hanger bracket 99, and is secured to drum 104 of power winch 105. Power winch 105 is rotatably secured to hanger frame 106.

With this design, lower chute 64 is capable of easy pivoting movement. For example, when raising movement of lower chute 64 is desired, piston rod 94 is retracted within power cylinder 90, thus pulling cable 92 upwardly around pulleys 96, 98 and 100. When downward positioning of chute 64 is necessary, piston rod 94 is extended. The feature of utilizing power cylinders 90 in the above manner enables rapid raising and lowering of lower chute 64. In addition, the use of power winch 105 enables fine position adjustment of lower chute 64, as is necessary for proper alignment of upper and lower flow paths of chute system 10.

For the purpose of regulating the flow of material along the lower flow path in accordance with the invention, a curved blade gate valve 110 is provided. FIG. 4 illustrates the valve 110 in fully open position. The ends of curved valve plate 112 of the valve 110 is secured to pivoting mounting flanges 114 carries by lower chute extension 64a in pivoting engagement. Flanges 114 are positioned outside adjacent parallel side body members 65a and pivotally secured to members 65a with pivot shafts 116.

One end of support arms 118 (inside members 65a) is fixedly attached to the leading edge of valve plate 112; the opposite end of the support arm being pivotally secured by pivot shaft 116. The valve plate 112 is capable of incremental cut-off travel within the flow path. This allows regulation of the flow, as will be seen more in detail below.

Figure 2:
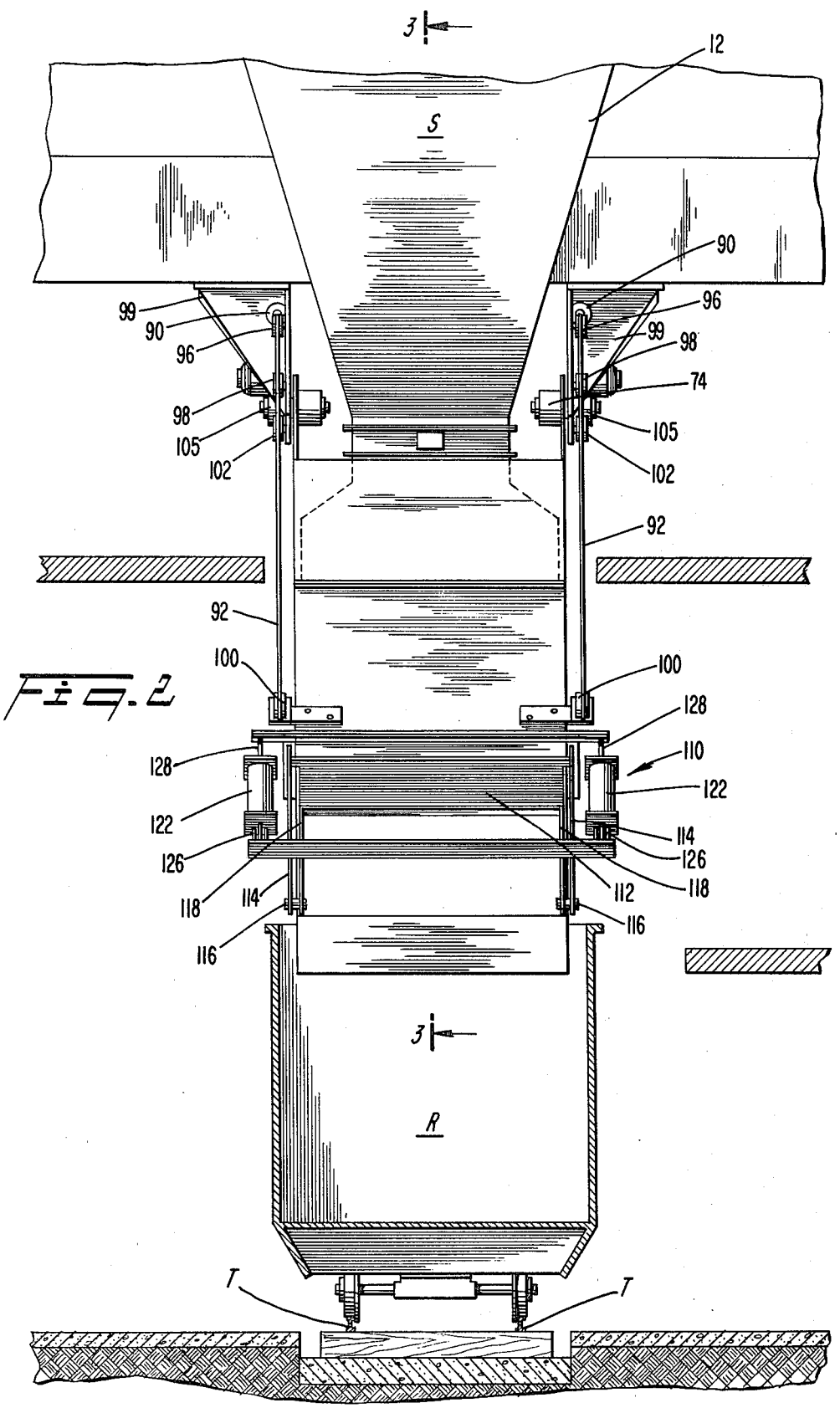
FIG. 2 is an end elevation view of the chute system in alignment with a storage bin discharging material into a hopper car.

Cylinders 122 are provided for moving valve plate 112 into and out of the flow path. As shown in FIGS. 2 and 4, cylinders 112 are correspondingly positioned adjacent exterior mounting flanges 114, with the end of piston rod 124 being pivotally secured to attachment ears 126. The opposite end of each piston 122 is pivotally secured to mounting flanges 128 projecting outwardly from the side body member 65a facing valve plate 112. With this design, valve plate 112 of diverter blade gate valve 110 is capable of pivoting into and out of the lower flow path of chute 64a through slotted opening 120. The feature of attaching the diverter blade gate valve 110 to the lower portion of lower chute 64 enables fine control of flow of bulk material within the chute. This feature is particularly useful during the topping off of railroad cars and other vehicles being loaded with material. By positioning diverter blade gate valve 110 in proximity to bottom discharge opening 69, material in-flight at any particular time is limited.

The full advantage of this invention may best be realized by following the operations involved in directing and controlling the flow of material through chute system 10. Prior to beginning the car loading cycle, lower chute 64 is in stored position (see dotted line position of FIG. 3). Power cylinder 90 is then operated to pivot the lower chute into alignment with the flow path of upper chute 10. Fine adjustments may be made with power winch 105, by raising or lowering lower chute 64 through cable 92 to ensure full communication of the flow paths. At the beginning of the car loading cycle, cylinders 59 of dual sliding gate 25 are operated drawing valve plates 48, 49 under low friction rolling movement to the open position.

At the end of the car loading cycle when the car is almost filled, the dual sliding gate valve 25 is fully closed. In the fully closed position, material within the upper and lower flow paths continues to flow, emptying the chute. However, by actuating diverter blade gate valve 110 positioned at the bottom of chute extension 64a with cylinders 122, valve plate 112 is operative to restrict and slow the flow of material through bottom discharge opening 69. When the diverter blade gate valve is in substantially fully closed position, the flow path is ideally still partially filled with coal. The lower flow rate achieved through the bottom discharge opening by regulating the valve 110 thereby enables precise topping off of the car without material spillage.

When the loading cycle is complete, lower chute 64 may be pivoted into stored position. As chute 64 is pivoted upwardly to stored position, curved plate 71a covers bottom discharge opening 20 of upper chute 15 thereby preventing material within the upper chute from spilling. As upward movement of lower chute 64 continues, curved retaining plate 85 covers the top inlet opening of the lower chute to prevent material spillage when the chute is raised into stored position.

The feature of seals 27 peripherally disposed within the bottom discharge opening 20 of the upper chute 10 prevents material from interfering with the smooth pivoting movement of the lower chute.

As shown in FIG. 1, loading of railroad cars R preferably utilizes two chute systems 10 positioned in spaced relation along the car length. With this arrangement, effective car filling is achieved in conjunction with low velocity car travel beneath the chutes. As the car travels in the direction indicated by arrow B, it will be understood that right-hand chute 64' is positioned over the car in operative position before the arrival of the chute 64 on the left. By suitably opening the valve arrangements of the first chute 64', the chute serves as a primary fill chute and generally fills the car to approximately ¾ capacity as the car travels lengthwise below the chute. With this filling arrangement the valve 110 of secondary fill chute 64 is suitably opened only partially to enable the chute 64 to accurately top off the car. As each chute 64, 64' in turn approach the leading end of the car R, dual gate valve 25 and curved blade valve 110 are closed in sequence; as described above. The chutes 64, 64' are raised sufficiently to clear the car height until positioning over a subsequent car occurs. The precision control provided allows accurate and rapid filling with no appreciable spillage of material.

The foregoing description of a preferred embodiment of the present invention has been presented for purposes of illustration and description. It is not intended to be exhaustive or to limit the invention to the precise form disclosed, and obviously, many modifications and variations are possible in light of the above teachings. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. A load out chute system for controlling and directing the flow of relatively large quantities of bulky material, comprising, in combination:
   (a) upper chute means having a top inlet opening and a bottom discharge opening defining an upper flow path;
   (b) lower chute means having a top inlet opening and a bottom discharge opening defining a lower flow path;
   (c) first valve means for opening and closing the upper chute to control feeding of material along said upper flow path;
   (d) means for pivotally mounting said lower chute means in relation to the upper chute means, whereby said lower chute means is capable of communication with said upper chute means for alignment of said upper and lower flow paths;
   (e) means for pivotally moving the lower chute means into and out of communication with said upper chute means to so align said flow paths, to adjust the slide angle of said lower flow path and to store the lower chute means in a raised position; and
   (f) second valve means carried by said lower chute means for regulating the flow of material along said lower flow path in increments from full open to full closed.

2. A chute system according to claim 1, further comprising third valve means for opening and closing the lower chute to control feeding of material along said lower flow path.

3. A chute system according to claim 2, wherein third valve means is positioned so that the valve opening is controlled by the position of lower chute means in relation to upper chute means, whereby said valve means is substantially fully opened when lower chute means is in communication with said upper chute means and closes as the lower chute means is raised to a substantially horizontal position.

4. A chute system according to claim 1, further comprising retaining means positioned for retaining material in lower chute means when said lower means is in a substantially raised position.

5. A chute system according to claim 1, wherein said upper chute means includes substantially planar side body members attached to define the upper flow path, wherein one of said side members is downwardly inclined toward the bottom discharge opening, thereby defining a upper flow path slide angle corresponding to the lower flow path slide angle when said upper and lower chute means are in full communication, and sealing means around said discharge opening.

6. A chute system according to claim 1, wherein said lower chute means includes side body members attached to define said lower flow path, wherein the lower chute top inlet opening substantially corresponds in size to the upper chute bottom discharge opening.

7. A chute system according to claim 3, wherein said third valve means includes an upwardly curved valve plate projecting outwardly from a side body member of lower chute means and positioned adjacent the top inlet opening, whereby said valve plate moves into and out of sealing engagement against said sealing means during travel along the upper chute discharge opening.

8. A chute system according to claim 4, wherein said retaining means includes an upwardly curved plate projecting outwardly from upper chute means, said plate positioned to close the lower chute top opening when said lower chute means is pivoted upwardly, thereby preventing spillage of material through the top inlet opening when said lower means is raised to a substantially horizontal stored position.

9. A chute system according to claim 1, wherein said second valve means includes a mounting flange pivotally fastened to the lower chute means and a curved valve plate projecting outwardly from the mounting flange towards the lower chute, and a slotted opening enabling said valve plate to pass through said opening and project into said lower flow path for regulating the flow of material along said path.

10. A chute system according to claim 9, wherein said second valve means is positioned in a bottom portion of said lower chute means.

11. A chute system according to claim 1, wherein said first valve means includes valve plate means positioned for opening and closing the upper chute top inlet opening, means defining a substantially horizontal travel plane for the valve plate means, and means for moving said valve plate means along said plane for opening and closing the upper flow path through said valves.

12. A chute system according to claim 11, wherein said plane includes first and second sets of rollers.

13. A chute system according to claim 11, wherein said valve plate means include two valve plates opposingly positioned and capable of entering the upper flow path.

14. A chute system according to claim 11, wherein means for moving the valve plate means include cylinder means fastened to said valve plate means.

15. A chute system according to claim 1 or 6, wherein means for pivotally moving the lower chute means into and out of communication with said upper chute means to so align said flow paths, includes a substantially triangular skirt projecting from said lower chute means, said skirt having an upper end adapted for pivotal fastening to an overhead structure, thereby enabling communication and alignment of upper and lower flow paths.

16. A chute system according to claim 15, wherein said skirt includes an arcuate bottom plate enabling said inlet opening of lower chute means to travel adjacent the bottom opening of said upper chute means.

17. A chute system according to claim 1, wherein said means for pivotally moving said lower chute means in relation to the upper chute means includes a power cylinder interconnected with the lower chute means by cable and pulley means, thereby enabling rapid raising and lowering of said lower chute means.

18. A chute system according to claim 17, wherein said pivoting means further includes a power winch interconnected with the lower chute means by said cable means for enabling fine adjustments to be made to said lower flow path slide angle, thereby enabling proper alignment of said upper and lower flow paths.

19. A chute system according to claim 1 or 9, further comprising cylinder means interconnecting the second valve means and lower chute means for actuating said second valve means, thereby regulating the flow of material along said lower flow path.

20. A method for improving the efficiency of material loading facilities for directing the flow of material stored within storage means into a moving loading car, comprising the steps of pivotally lowering primary and secondary chute means into a discharge position as a loading car approaches at low velocity, fully opening gate valve means of the primary chute means as the car enters the discharge flow path, directing material through said primary chute means in rapid flow relation substantially filling said moving car, and partially opening a valve means positioned in proximity to the bottom discharge opening of the secondary chute means for incrementally adjusting and directing material in low flow relationship through said second chute means into the car, for topping off said car without significant material spillage.

* * * * *